3,417,067
PREPARATION OF FREELY-SOLUBLE POLYMERS OR TRINITRATOPENTAERYTHRITYL ACRYLATE

George Bond Lucas, Golden, Colo., assignor to Rohm & Haas Company, Philadelphia, Pa., a corporation of Delaware
No Drawing. Continuation-in-part of application Ser. No. 610,439, Sept. 7, 1956. This application Aug. 19, 1958, Ser. No. 757,174
12 Claims. (Cl. 260—89.5)

This invention concerns a method for the preparation of freely-soluble polymers of trinitratopentaerythrityl acrylate (pentaerythritol trinitrate acrylate).

A need has arisen for a freely-soluble polymer of trinitratopentaerythrityl acrylate in connection with an advantageous method of preparing combustible and also explosive compositions based on polymers of this ester. A freely-soluble form of a polymer of this ester can be dissolved in a monomer of this ester during the formation of such compositions and thus decrease shrinkage when the monomer is polymerized, decrease the heat evolved in final polymerization, and provide more perfectly shaped grains and other improvements in the placing or casting of the composition based on these materials.

Heretofore the above desired procedure has not been practical, except perhaps under exceptional conditions with especially purified laboratory materials. Even then considerable difficulty is encountered in getting previously known polymer to dissolve in monomer. The basic difficulty is that polymer from trinitratopentaerythrityl acrylate when polymerized in bulk or solution or even in suspension gives enough crosslinking to interfere with solubility in monomer under conditions which are permissable for effecting solution and before polymerization sets in.

Yet by the method of this invention it now becomes possible to prepare polymers of the said acrylate in a form which is readily dispersed in and taken up by the monomeric ester. In the process of this invention crosslinks do not develop even though the monomer used is highly impure and during bulk polymerization would give polymers not soluble in such a powerful solvent as acetone. Furthermore, the soluble polymer obtained according to this invention is in finely divided form which can be mechanically mixed with other ingredients.

My process comprises forming a solution of trinitratopentaerythrityl acrylate in a polar organic solvent, one which is preferably at least partially miscible with water and which is a solvent for both monomer and polymer, emulsifying the resulting solution in water with the aid of a water-soluble emulsifying agent, effecting polymerization of said acrylate with the aid of a free-radical initiator, and precipitating the polymer with a water-miscible organic solvent which is a nonsolvent for the polymer.

As solvent for preparing the solution of monomer there may be used a ketone such as methyl ethyl ketone, or the propyl ketones, an ester such as ethyl or propyl acetate or methyl propionate, or tetrachloroethane. The solvent used boils above the temperatures encountered during polymerization and yet is readily removable by distillation. A range of 75° to 150° C. for the boiling points of the solvents is a suitable one. The solution may contain from 5% up to saturation of the monomer. Convenient concentrations are 20% to 40% of monomer in the solution.

The temperatures of polymerization will fall between 20° and 100° C. and are conveniently between 40° and 60° C., the temperature used depending on the initiator system used and the balance with time and concentration. Since the polymerization reaction is not markedly exothermic, rise in temperature is not extensive nor is it usually troublesome.

Times for effecting polymerization depend upon temperature, concentration, solvent, and initiator system. Times of one to 24 hours can be used.

As precipitating solvent, there is best used methanol. Ethanol or isopropanol or mixtures of these or their mixtures with methanol may also be used. The volume of such solvent should be two to fifteen times that of the emulsion polymerization system. The choice of solvent has some influence on the form of the polymer precipitated.

After the dispersion of polymer and precipitating solvent are mixed, preferably at temperatures from 0° to 30° C., the polymer precipitates rapidly. As soon as the precipitate has formed, it is separated, best below 30° C., by filtering or centrifuging. Prompt separation is very desirable as it has been observed that the polymer is quite pure when thus separated. Separation after standing for some time has been noted as giving a less pure product.

The separated polymer is washed with water and lower alcohol if desired, and dried. Drying may be done in air or under reduced pressure. Temperatures of 20° to 50° C. are generally used.

The resulting product consists of finely divided polymer particles which are readily soluble in acetone. The pure polymer has a second order transition temperature of about 30° C. It is for this reason that it is best to effect precipitation below 30° or to bring the precipitated dispersion below 30° C. before separating.

The usual polymers of trinitratopentaerythrityl acrylate here prepared have molecular weights from 50,000 to 2,000,000. The molecular size and range depend upon concentrations, initiator system and its concentration, type of emulsion, the absence or presence of regulators or chain terminating agents, temperature, and time, as will be understood by those skilled in the polymer art.

Molecular weights can be determined through osmotic pressure measurements, giving number average molecular weights, or through viscosities in acetone or methyl ethyl ketone solutions.

The initiator systems belong to the class of free radical polymerization catalysts. The initiator may be a persulfate, such as potassium, sodium, or ammonium persulfate or an organic peroxide having some degree of solubility in water or a combination of these.

The peroxidic material may be supplemented with a regulator, such as octyl, dodecyl, or tetradecyl mercaptan or hydroxyethanethiol. There may be used, if desired, a reducing agent, such as an alkali metal sulfite, metabisulfite, thiosulfate, or hydrosulfite.

The concentration of initiator in the emulsion may vary from about 0.01% up to about 5%.

The initiator system may also comprise an activator. Ions of metals which undergo valence changes are particularly useful and only a few parts per million of ferrous ions need be supplied to activate the initiator system.

Satisfactory emulsifiers are members of several classes of surface active agents and there has not been noted any truly critical differences among them, although the non-ionic agents and anionic agents are preferred. The readily water-soluble condensates of ethylene oxide with long-chained alcohols or mercaptans or alkylphenols or other reactive compounds supplying a hydrophobic group, such as tall oil form a class of considerable interest and utility. It is preferred that this type of agent have 20 to 100 ether groups from the alkylene oxide per mole of the long-chained starting material supplying the hydrophobic portion of agent.

Anionic emulsifiers include water-soluble salts of alkylbenzenesulfonates, alkylphenoxyethoxylsulfonates, dialkylsulfosuccinates, and alkyl sulfates and sulfonates.

The concentration of emulsifying agent may vary from 0.1% to 5% of the total emulsion system. On the basis of the water-solution of emulsifier, this corresponds in general to using about 0.2% to 10% solutions of this agent. It is generally desirable to use no more emulsifier than is needed to maintain dispersion of solvent solution of monomer or polymer during the processing, since it is desired to precipitate polymer to obtain it in the form of fine, discrete particles.

The monomeric trinitratopentaerythrityl acrylate which is used may be of a good degree of purity or it may be a rather impure product such as has been heretofore available. In fact the rather crude product which has resulted from the previously known methods of synthesis can be used in this process. In spite of the fact that these crude products give insoluble polymers by bulk, solution, or even bead polymerization, they give freely-soluble polymers by the process described above, provided the steps above set forth are followed. Of course, the yield from the crude monomers can be only in proportion to the actual content of trinitratopentaerythrityl acrylate.

The following examples are supplied for purposes of illustration and not by way of limitation. Parts are by weight unless otherwise designated.

EXAMPLE 1

A solution is made of five parts of a trinitratopentaerythrityl acrylate of about 90% purity in 10 parts of methyl ethyl ketone. A solution of 0.6 part of an octylphenoxypolyethoxyethanol, having an average of 40 ether groups, as emulsifier, is made in 20 parts of distilled water. The solution of monomer is slowly stirred into the aqueous solution of the emulsifier and while the mixture is stirred and heated to about 50° C., a solution of 0.6 part of ammonium persulfate is added followed by 0.005 part of tert-dodecyl mercaptan. Polymerization begins and is continued while the mixture is stirred for seven hours. The mixture is cooled and poured into about 300 parts of cold methanol. A white precipitate forms and with the mixture at about 30° C. it is filtered off. It is washed with methanol and water and dried in the air. The polymeric trinitratopentaerythrityl acrylate which is thus obtained is in the form of fine, fluffy particles which are soluble in acetone. The yield of polymer is 75%.

EXAMPLE 2

The above procedure is followed with a solution of 10 parts of trinitratopentaerythrityl acrylate in 20 parts of methyl ethyl ketone and a solution of one part of the emulsifier. The mixture is treated with ammonium persulfate and dodecyl mercaptan as above. Polymerization is continued for six hours. The yield of polymer is 74%. It is likewise freely soluble in organic solvents for the polymer.

EXAMPLE 3

The above procedure is repeated with a solution of 10 parts of trinitratopentaerythrityl acrylate in 20 parts of methyl ethyl ketone and a solution of five parts of the emulsifier in 20 parts of water. The same initiator system is used plus about ten p.p.m. of ferrous sulfate. The yield of polymer after four hours is 87%. The product is likewise freely soluble in organic solvents such as acetone and methyl ethyl ketone.

EXAMPLE 4

A solution of five parts of trinitratopentaerythrityl acrylate in 15 parts of tetrachloroethane is gradually added to a stirred solution of 0.13 part of sodium dioctylsulfosuccinate in 18 parts of water. There is added 0.6 parts of potassium persulfate. The mixture is heated to maintain it at about 50°–60° C. and the mixture is stirred for eight hours. The reaction mixture is cooled to 20° C. and poured into methanol also at 20° C. A white precipitate forms which is separated by centrifuging. The product is washed with water and methanol and air dried. The yield is 77% of freely-soluble polymer.

EXAMPLE 5

The procedures used above are repeated with a solution of 1.2 parts of octylphenoxypolyethoxyethanol having 20 ether groups and a solution of five parts of monomer in 10 parts of methyl ethyl ketone. As initiator there is used 0.1 part of ammonium persulfate. Polymerization is carried on for five hours and the polymer is precipitated as above. There is obtained a yield of 80% of finely divided, freely-soluble polymer.

EXAMPLE 6

The procedure is followed with a solution of five parts of the monomer in 20 parts of tetrachloroethane, a solution of 0.13 part of sodim dioctylsulfosuccinate in 10 parts of water and 0.03 part of potassium persulfate as initiator. Polymerization is carried out for one hour at 50° C. The polymer is separated as before in yield of 75%. The polymer is freely soluble in ketones. It has an intrinsic viscosity of 2.70 (in deciliters per gram) and has a particle size of one to five microns.

EXAMPLE 7

(a) The procedure is repeated with a solution of five parts of a trinitratopentaerythrityl acrylate preparation assaying 60% of the monomer which forms a crosslinked insoluble polymer in bulk polymerizations, this preparation being dissolved in 10 parts of methyl ethyl ketone. The solution of emulsifier is made with 1.2 parts of octylphenoxypolyethoxyethanol having 40 ether groups. The initiator system consists of 0.06 part of ammonium persulfate and 0.03 part of dodecyl mercaptan. Polymerization is continued for two hours. The yield of polymer is 88%.

(b) The above materials are used but 0.12 part of ammonium persulfate is used and 0.064 part of the mercaptan. Polymerization is continued for two hours at 50°–55° C. Yield of polymer is 92%. It has an intrinsic viscosity of 0.14 and is freely soluble in ketones.

(c) The previous procedure is followed but polymerization is continued for 18 hours. The polymer obtained has an intrinsic viscosity of 0.82. It should be commented that in spite of the fact that the crude monomer used will crosslink in bulk polymerizations, the polymer obtained even after 18 hours remains fully and freely soluble in ketones and in monomer.

(d) A series of polymerizations is carried out as in (a), but with 0 part, 0.005 part, 0.01 part, and 0.015 part of dodecyl mercaptan. The polymers obtained have specific viscosities of 0.322, 0.29, 0.268, and 0.24, respectively. The molecular weights vary from 100,000 to 250,000.

EXAMPLE 8

A solution of 10 parts of trinitratopentaerythrityl acrylate is made in 30 parts of tetrachloroethane and stirred into a solution of one part of a nonylphenoxypolyethoxyethanol with about 50 ether groups in 30 parts of water. Thereto is added a solution of 0.03 part of ammonium persulfate in a minimum amount of water, followed by a solution of 0.05 part of sodium hydrosulfite, also in a minimum amount of water. Two drops of a 10% ferrous ammonium sulfate solution are then added and the mixture stirred and cautiously warmed to 50° while polymerization takes place. After an hour about 0.01 part of tert-butyl perbenzoate is added and after 15 minutes the mixture is cooled and extended with ten volumes of methanol at 15°–20° C. There precipitates polymer which is centrifuged, washed, and dried. The yield is 96% of freely-soluble, finely particled polymer.

EXAMPLE 9

A vessel equipped with a sirrer, nitrogen inlet tube, and thermometer is charged with 60 parts of an aqueous solution prepared by dissolving 15.8 parts of an octylphenoxypolyethoxyethanol having about 40 ether groups in 1000 parts of water, a solution of 5 parts of trinitratopentaerythrityl acrylate in 20 parts of methyl ethyl ketone, 0.1 part of ammonium persulfate, and 0.5 part of a solution prepared by dissolving 0.3 part of $FeSO_4 \cdot 7H_2O$ in 200 parts of water. The vessel is thoroughly flushed with nitrogen and cooled with an ice bath to bring the contents to a temperature of 10° C. The vessel is maintained under a slight nitrogen pressure. Addition is made of 0.1 part of sodium metabisulfite. After 15 minutes the temperature of the mixture is 15° C. It is poured into about 800 parts of methanol at 15° C. with rapid stirring. There is obtained a powdery solid, which, when separated and dried, corresponds in composition to the desired polymer. The yield is 70%. The polymer is freely soluble in ketones.

As has been demonstrated above, soluble polymer is prepared by the method of this invention even though the starting monomer contains a considerable proportion of difunctional material which causes cross-linking of polymers formed therefrom by previous methods of polymerization. Obviously, a cross-linked nonsoluble polymer, such as may be obtained by bulk polymerization from monomers containing as low as a fraction of one percent of dinitratopentaerythrityl diacrylate, cannot be used in compositions wherein it is necessary that the polymer be dissolved nor where it is distinctly advantageous that the polymer be dissolved. Yet by the process of this invention polymer is provided which is soluble whether the monomer is pure or not, as shown above.

The polymer of this invention can be used not only in the same way as previously known polymers, but also in advantageous ways wherein solubility is needed, as will now be illustrated.

In the preparation of the following composition there are observed the conventional precautions which are exercised for the protection of life and property in the manufacture of igniter mixtures. There are dissolved 10 parts by weight of a polymer made by any of the examples above in 100 parts of methyl ethyl ketone, or acetone. There are mixed therewith 10 parts of amorphous boron powder and 10 parts of potassium nitrate granules. This mixture is poured onto a cotton gauze which is permeated with the mixture. Solvent is evaporated leaving a deposit of solids held throughout the gauze which is now rolled about a squib which is to be wired to a source of current. The unit provides an effective igniter system.

In the following preparation there are observed the conventional precautions taken in the preparation of propellant mixtures. There are mixed 75 parts of polymer from any of the examples above and 25 parts of monomeric trinitratopentaerythrityl acrylate. The mixture is stirred and heated above 80° C. under reduced pressure to remove trapped air. To the resulting melted mixture there are added with stirring 50 parts of ammonium nitrate of 20 to 50 mesh and 50 parts of ammonium nitrate of about 200 mesh. The compostion is compression molded to give cylinders about 1" x 4". These are cured for 48 hours at 80° C. and cooled to 30° C. to give solid cylinders useful in conjunction with an igniter for a noncorrosive, smokeless source of gas pressure as may be used to provide a quick release of energy in turbines for operating pumps and controls in guided missiles.

This application is a continuation-in-part of application Ser. No. 610,439, filed Sept. 7, 1956 and now abandoned.

I claim:
1. A process for preparing a freely-soluble polymer of trinitratopentaerythrityl acrylate which comprises dissolving said acrylate in a polar organic solvent for this acrylate and its linear polymer which is at least partially miscible with water, and which boils between about 75° C. and 150° C., emulsifying the resulting solution in water with the aid of a water-soluble emulsifying agent, polymerizing the emulsified acrylate between 20° and about 100° C., under the influence of a free radical initiator having at least partial solubility in water, precipitating the resultant polymer with a water-soluble lower alkanol, and separating the precipitated polymer.

2. A process for preparing a freely-soluble polymer of trinitratopentaerythrityl acrylate which comprises dissolving said acrylate in a solvent from the class consisting of methyl ethyl ketone, methyl propyl ketone, and tetrachloroethane, emulsifying the resulting solution in an aqueous solution of 0.2% to 10% of a nonionic, surface-active, water-soluble condensate formed with 20 to 100 moles of ethylene oxide per mole of compound supplying the hydrophobic portion of the condensate, polymerizing the emulsified acrylate between 20° and 100° C. under the influence of a free radical initiator which is at least partially water-soluble and which is present in an amount of 0.01% to 5% of the emulsion precipitating the resulting polymer with methanol, and separating it.

3. A process for preparing a freely-soluble polymer of trinitratopentaerythrityl acrylate which comprises dissolving said acrylate in a solvent from the class consisting of methyl ethyl ketone, methyl propyl ketone, and tetrachloroethane, emulsifying the resulting solution in an aqueous solution of 0.2% to 10% of a nonionic, surface-active, water-soluble condensate of a compound from the class consisting of long-chained alcohols, long-chained mercaptans, and alkylphenols, said compound being condensed with 20 to 100 moles of ethylene oxide per mole of said compound and supplying the hydrophobic portion of the said condensate, polymerizing the emulsified acrylate under the influence of a water-soluble persulfate initiator between 20° and 100° C., precipitating the resulting polymer with methanol, and separating it.

4. A process for preparing a freely-soluble polymer of trinitratopentaerythrityl acrylate which comprises dissolving said acrylate in methyl ethyl ketone, emulsifying the resulting solution in an aqueous solution of 0.2% to 10% of an alkylphenol-ethylene oxide condensate having 20 to 100 ether groups, polymerizing the emulsified acrylate between 20° and 100° C. under the influence of a water-soluble persulfate initiator, precipitating the resulting polymer with methanol, and separating it.

5. A process according to claim 4 in which a regulator is present along with the initiator.

6. A process according to claim 4 in which ferrous ions are present along with the initiator.

7. A process according to claim 4 in which a reducing agent is present along with the initiator.

8. A process for preparing a freely-soluble polymer of trinitratopenaerythrityl acrylate which comprises dissolving said acrylate in a solvent from the class consisting of methyl ethyl ketone, methyl propyl ketone, and tetrachloroethane, emulsifying the resulting solution in an aqueous solution of 0.2% to 10% of an anionic surface-active, water-soluble emulsifier, polymerizing the emulsified acrylate between 20° and 100° C. under the influence of a free radical initiator which is at least partially water-soluble, precipitating the resulting polymer with methanol, and separating it.

9. A process for preparing a freely-soluble polymer of trinitratopentaerythrityl acrylate which comprises dissolving said acrylate in a solvent from the class consisting of methyl ethyl ketone, methyl propyl ketone, and tetrachloroethane, emulsifying the resulting solution in an aqueous solution of 0.2% to 10% of an anionic surface-active, water-soluble emulsifier, polymerizing the emulsified acrylate between 20° and 100° C. under the influence of a water-soluble persulfate initiator, precipitating the resulting polymer with a water-soluble lower alkanol, and separating the precipitated polymer.

10. The process of claim 9 in which a regulator is present along with the initiator.

11. A process for preparing a freely-soluble polymer of trinitratopentaerythrityl acrylate which comprises dissolving said acrylate in methyl ethyl ketone, emulsifying the resulting solution in an aqueous solution of 0.2% to 10% of an anionic surface-active, water-soluble emulsifier, polymerizing the emulsified acrylate between 20° and 100° C., under the influence of a water-soluble persulfate initiator, precipitating the resulting polymer with methanol, and separating the precipitated polymer.

12. The process of claim 11 in which is present a reducing agent.

No references cited.

JOSEPH L. SCHOFER, *Primary Examiner.*

H. WONG, *Assistant Examiner.*

U.S. Cl. X.R.

260—32.8, 33.8, 31.2; 149—88, 47, 20